J. G. HEASLET.
CLUTCH DEVICE.
APPLICATION FILED NOV. 3, 1914.
1,166,205.
Patented Dec. 28, 1915.
3 SHEETS—SHEET 1.
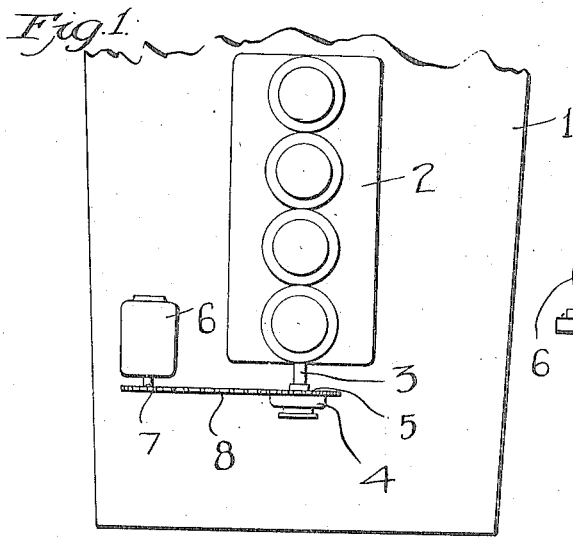
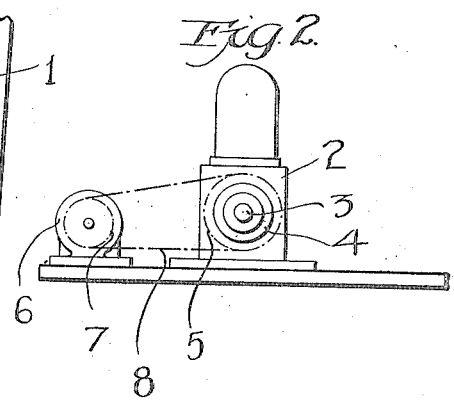
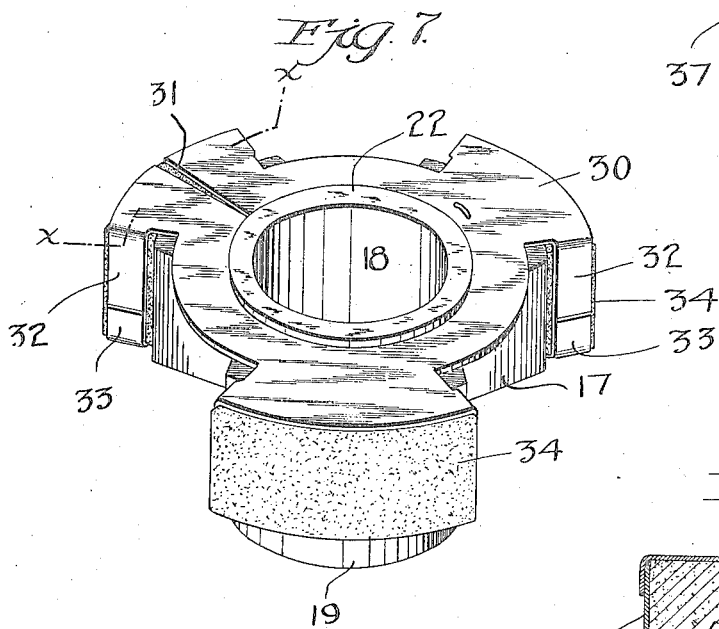
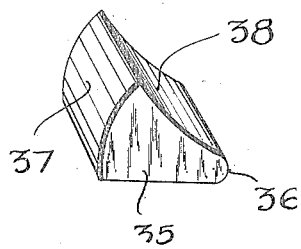
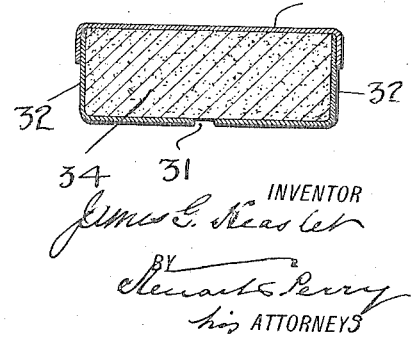

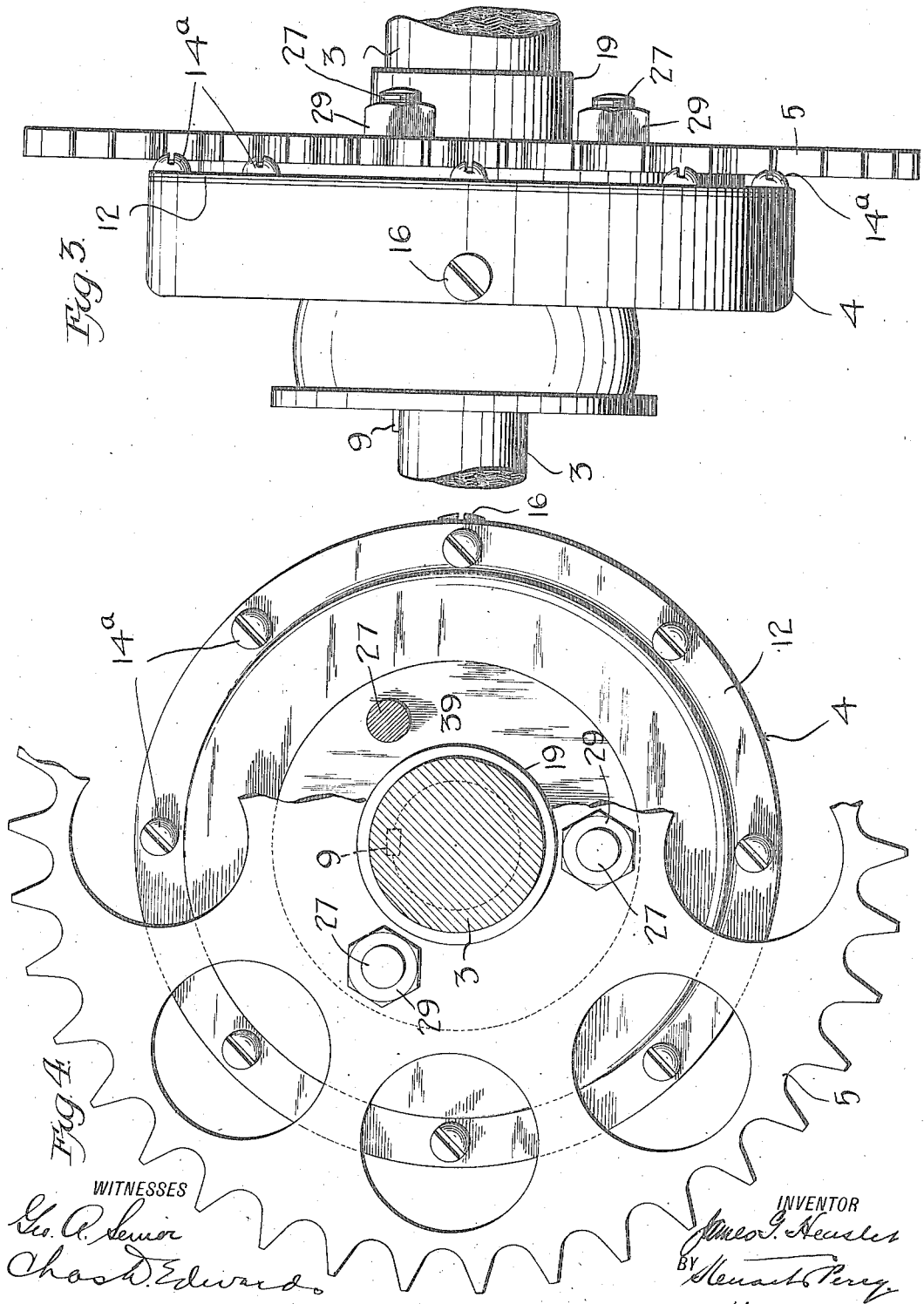

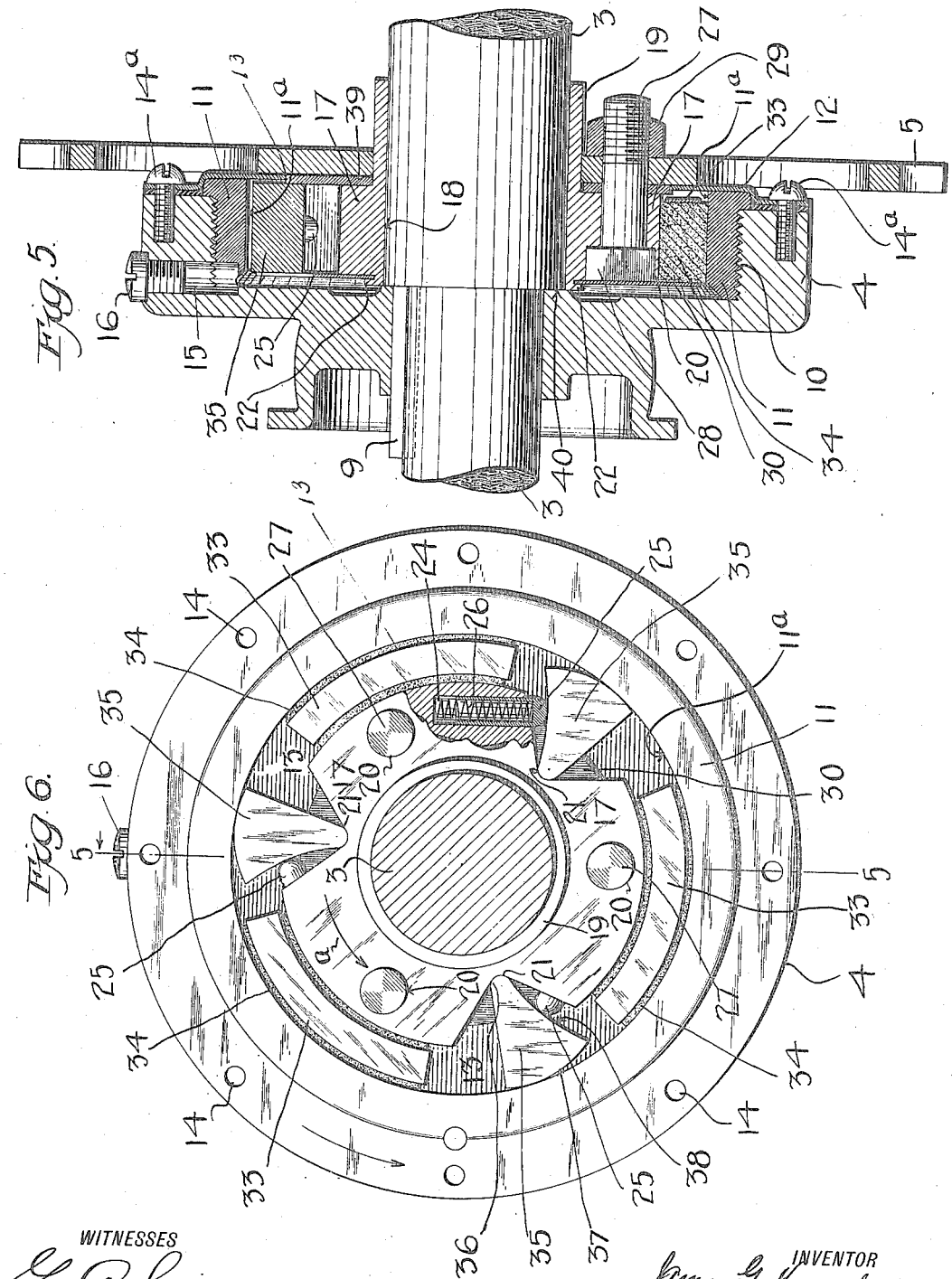

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

CLUTCH DEVICE.

1,166,205. Specification of Letters Patent. Patented Dec. 28, 1915.

Application filed November 3, 1914. Serial No. 870,030.

*To all whom it may concern:*

Be it known that I, JAMES G. HEASLET, a citizen of the United States of America, and resident of the city of Detroit, county of Wayne, State of Michigan, have invented certain new and useful Improvements in Clutch Devices, of which the following is a specification.

My invention relates to an improvement in devices for imparting an initial movement to gas engines for the purpose of starting the same, said device being so constructed as to be automatically released from its engagement with the gas engine when the speed of the gas engine exceeds the initial speed of the starting mechanism. Such devices are generically known in the art. I do not, therefore, seek to claim the same broadly, but only the specific arrangement of parts coöperating to form a new and useful device having features of advantage over those previously disclosed.

I employ electric means as a source of power to operate the starter herein described. This electric means, consisting of a motor, is suitably connected with the driving shaft of the gas engine through the medium of the clutch members hereafter to be described, and in this way the main shaft of the gas engine is set in motion and by its initial revolution the gas is drawn into the engine and exploded, thus causing the gas engine to operate with its own power, which power causes the same to rotate with a considerably greater speed than that imparted by the electric motor. The clutch device which is the subject matter of this invention is so organized that when the speed of the gas engine exceeds the speed of the electric motor the electric motor is released in its connection with the main shaft of the gas engine, so that while it may continue to operate within its initial velocity no greater speed will be imparted thereto than that fixed for the operation of the electric motor, notwithstanding the fact as stated that the gas engine is operating at a greater speed. These results are accomplished through the medium of the devices which I am about to describe.

I have illustrated my invention, in the accompanying drawings designating the parts by numerals and referring to like parts by like numerals.

Figure 1 is a diagrammatic view showing a plan of a gas engine with my starter mounted on the main shaft thereof and connected up with an electric motor. Fig. 2 is a front elevation of the same. Fig. 3 is an elevation of my device inclosed in its casing, while Fig. 4 is a plan view of the same with a part of the sprocket wheel broken away. Fig. 5 is a vertical section of Fig. 3, the main shaft being shown in perspective. Fig. 6 is a plan view of Fig. 5 with the sprocket wheel and cover removed to show the internal arrangement of the clutch member hereafter to be described. Fig. 7 is a perspective view of the clutch member, the same being inverted from the position in which it is shown in Fig. 6. Fig. 8 is a perspective view in detail of a friction pawl employed in the device, and Fig. 9 is a detail of an absorbent pad and its mountings taken on the line X—X of Fig. 7.

The details of construction are described as follows: 1 is a base, as for instance an automobile body, on which is mounted a gas engine, as 2, having a main shaft 3.

4 is the casing of my clutch device, carrying a sprocket wheel 5, while 6 is an electric motor having suitable electrical connections not shown, with a sprocket wheel mounted on the armature shaft, as 7, and a suitable belt or chain connection 8 between the sprocket wheels 7 and 5, whereby power is transmitted from the motor to the main shaft of the gas engine.

I prefer to construct the main shaft 3 of the gas engine with a shoulder or boss, 40, as illustrated in Fig. 5. It may, however, be made of uniform size. The casing 4 is provided with a central aperture to receive the said shaft 3, and rests against said boss 40, it is keyed to the shaft by the key 9. Said casing 4 has an annular aperture 10 with a surface axial to the main shaft, while 11 is a ring having an internal bearing surface 11$^a$ axial to the main shaft, the same being of a size to fit into the aperture 10, and to be secured therein by a suitable screw thread as shown, or it may be introduced therein under well known conditions of heat and pressure so as to become rigidly fixed within said aperture of the casing 4.

12 is a sheet metal cover having a central aperture indicated as 13, and screw holes, indicated as 14.

14$^a$ are suitable screws to hold said cover in position.

15 is a port through the casing 4 and ring 11, sealed by a suitable screw, as 16.

17 I characterize as the clutch member. It is annular in form, having a central aperture 18, of a size to receive the shaft 3 upon which it is mounted to rotate freely.

19 is an extension to provide a greater bearing surface for said member in its axial movement on the shaft. This clutch member 17 is provided with 3 bolt holes 20, and at the base thereof apertures to receive the heads of suitable bolts. Said clutch member is also provided with peripheral indentures, as at 21, forming sockets adapted to receive suitable friction pawls hereafter to be described. The clutch member 17 is also provided with an annular flange, as 22. The clutch member is also provided with apertures 24 to receive a plunger and spring member.

25 is the plunger, while 26 is the spring inclosed therein, as shown in Fig. 6.

27 is a bolt, 28 the bolt head, while 29 is a nut.

30, best seen in Fig. 7, is a metallic disk split, as at 31, and provided with flanges bent at right angles to the disk, as 32.

33, best shown in Fig. 9, is a retaining member adapted to span the flanges 32 last referred to, and hold them in position. 34 is a pad of absorbent material, preferably fibrous in its construction, and adapted to take up and hold within its fibers lubricating material and to distribute the same over the surface with which it is brought in contact. These pads 34 are embraced by the flanges 32 and the retaining member 33, and are thus held in contact with the periphery of the clutch member 17.

35 are friction pawls substantially triangular in longitudinal cross-section, the apex of the triangle being rounded, as at 36, to coöperate with the socket formation 21 in the periphery of the clutch member to move therein, while the face 37 is cut in the arc of a circle of less diameter than the arc of the internal periphery 11$^a$ of the ring 11.

38 is preferably concave in cross-section, to engage an elastic member, as the bolt 25.

The elements just described are assembled as follows: The casing 4 is run onto the shaft 3 and keyed thereto by the key 9. The ring 11 is screwed into the casing 4 so as to present the internal peripheral bearing 11$^a$. I then introduce through the clutch member 17 the bolts 27, seating their heads in the aperture prepared for that purpose.

The lubricating pads 34 are secured to the clutch member 17 as follows: The sheet metal disk 30 being split at 31 is sprung under the boss or flange 22, and in that manner is secured to the clutch member 17. The flanges 32 are folded over the lubricating pads 34, while the securing member 33 embraces said flanges 32 and holds the pad member in position on the periphery of the clutch member 17. The clutch member 17 as shown in Fig. 7, is then inverted and introduced in to the apertures of the casing 4, while being run on the shaft 3. The cover member 12 is placed in position and secured by the screws 14$^a$. A washer member 39, having a central aperture, is run on the exterior of the upright 19, and lies on the upper side of the clutch member 17, the same being pierced by the bolts 27. The sprocket wheel 5 is then run on the bolts 27 and secured thereto by the nuts 29. Through the chain 8 the sprocket wheel 5 is connected with a corresponding sprocket wheel 7 on the shaft of the electric motor 6, and by the operation of the said motor power is communicated to the clutch member 17. The screw 16 is removed and a suitable quantity of lubrication is supplied through the port 15 to the interior of the casing 4 and thence to the pads 34, said port being closed by the screw 16.

The operation of the device is as follows: When it is desired to start the engine current is supplied to the motor 6, and the same operates to rotate the clutch member 17, such rotation being in the direction of the arrow $a$, Fig. 6. The spring bolts 25 operate to keep the pawls 35 in contact with the internal peripheral bearing surface 11$^a$. With the rotation of the clutch member 17, as stated, these friction pawls operate in conjunction with the sockets 21 in which they move to bind the clutch member to the friction surface 11$^a$, and consequently with the rotation of the said clutch member 17 the casing 4 will revolve, and as this casing is secured to the shaft 3 that shaft will also revolve and cause the gas engine to make one or more rotations until the same is brought under the operation of the exploding gas. Should the rate of rotation of the shaft 3, imparted by the gas engine, exceed the rate of rotation imparted by the electric motor, the casing 4 will revolve more rapidly than the clutch member 17. In such case the friction pawls 35 are adapted to yield their clutching engagement with the friction surface 11$^a$ by reason of the fact that such friction surface is traveling faster than said friction pawls, and thus the rate of rotation of the electric motor will not be disturbed, and so when the electric motor ceases to operate the same conditions are maintained and the clutch member will remain stationary, while the casing will revolve with the shaft 3. The absorbent pads 34 will take up the lubricating oil and evenly distribute the same over the surface 11$^a$, the said pads and pawls being in fixed relation, and that portion of the friction surface to which the pawls are applied will be constantly maintained in a state of lubrication. I have observed that such constant lubrication is a matter of great importance in the operation of a device of this nature.

What I claim is:

1. In a gas engine starter wherein friction pawls are employed to coöperate with a bearing surface substantially as described; absorbent pads mounted with a fixed relation to said pawls and adapted to make contact with said bearing surface in the operation of the device.

2. A starter for gas engines, comprising a casing having a central aperture to receive the main shaft of the engine, and means to secure the same thereto, said casing having an internal annular bearing surface axial to said shaft; a clutch member having a central aperture to receive said shaft, on which it is mounted to revolve within said casing and adjacent said bearing surface; peripheral sockets in said clutch member and friction pawls interposed between said sockets and said bearing surface; absorbent pads carried on the periphery of the said clutch member and making contact with said bearing surface, with means to rotate said clutch member.

3. A starter for gas engines comprising a casing having a central aperture to receive the main shaft of the engine, and means to secure the same thereto, said casing having an internal annular bearing surface axial to said shaft; a clutch member having a central aperture to receive said shaft, on which it is mounted to revolve within said casing and adjacent said bearing surface; peripheral sockets in said clutch member and friction pawls interposed between said sockets and said bearing surface, said clutch member provided with an annular boss or shoulder adjacent its surface; a disk of metal having a central aperture, and split radially from said central aperture, the same adapted to be sprung under said boss, said disk having extending arms; absorbent pads adapted to be embraced by said arms, and means to confine said pads within said arms, said pads being interposed between the periphery of the clutch member and said bearing surface, and adapted to make contact with the latter, with means to rotate such clutch member.

4. A starter for gas engines, comprising a casing having a central aperture to receive the main shaft of the engine, and means to secure the same thereto, said casing having an internal annular bearing surface axial to said shaft; a clutch member having a central aperture to receive said shaft on which it is mounted to revolve within said casing and adjacent said bearing surface; peripheral sockets in said clutch member, and friction pawls interposed between said sockets and said bearing surface; absorbent pads carried on the periphery of the said clutch member and making contact with said bearing surface; elastic means interposed between said clutch member and said pawls, directed to maintain said pawls in contact with said bearing surface, with means to rotate said clutch member.

Signed by me at the city of Detroit, Mich., this 22nd day of October, 1914.

JAMES G. HEASLET.

Witnesses:
R. E. SCRATCH,
GUY M. EGGLESTON.